May 26, 1970    R. W. FARMER    3,513,603
METHOD OF TRUEING ROLLER BEARINGS IN A BLOCK ASSEMBLY
Filed March 4, 1968
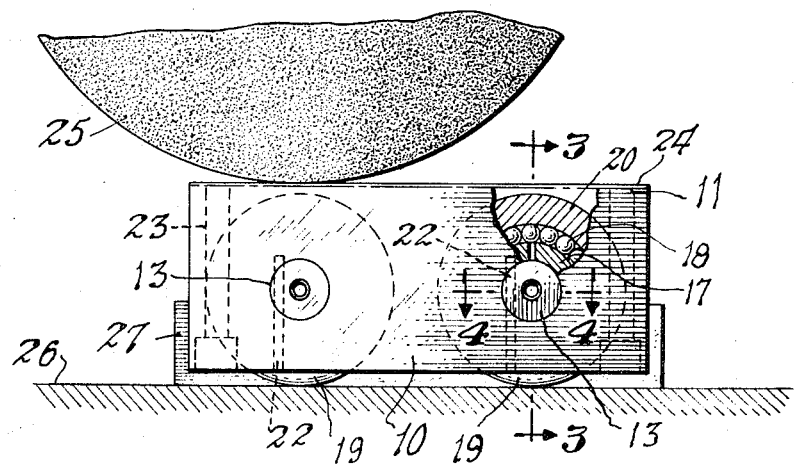
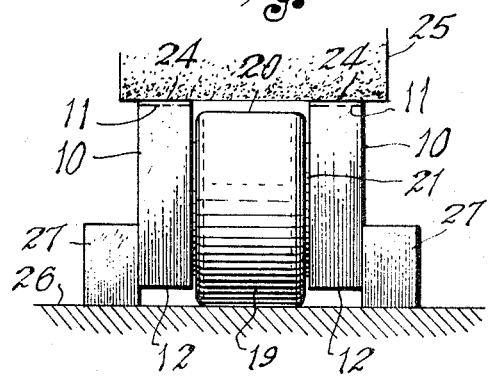
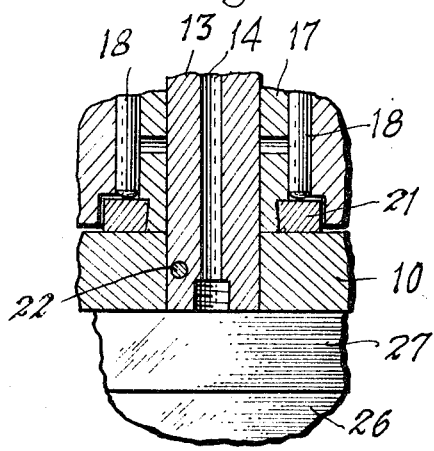
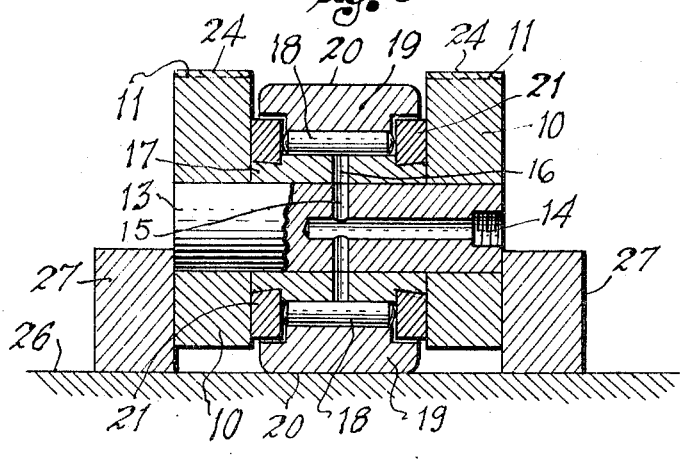
INVENTOR.
Robert W. Farmer,
BY
Larry B. Rook,
ATTORNEY United States Patent Office 3,513,603
Patented May 26, 1970

3,513,603
METHOD OF TRUEING ROLLER BEARINGS IN A BLOCK ASSEMBLY
Robert W. Farmer, Livingston, N.J., assignor, by mesne assignments, to Raritan Bearing Corporation, a corporation of Delaware
Filed Mar. 4, 1968, Ser. No. 710,009
Int. Cl. B24b 1/00
U.S. Cl. 51—323                2 Claims

ABSTRACT OF THE DISCLOSURE

A pair of anti-friction roller bearings is supported transversely between a pair of side walls which have substantially parallel flat top and bottom faces. The bearings have outer raceways whose outer diameters are such that a transverse plane common to either the top or the bottom faces of the side walls passes through both outer raceways as a chord thereof; so that a portion of each outer raceway extends outwardly beyond the chordal plane and provides the load bearing contact surface of the bearing. In order to insure distribution of load uniformly over the bearings, the points of contact of the outer raceway bearing surfaces with the planar face of a track, rail, machine way or the like must lie in a plane that will be common to the plane of the face of the rail, track, or way over which the bearings roll in linear motion. This is accomplished by anchoring the assembly on a flat, planar surface with the outer raceways of both bearings firmly in contact therewith. The then uppermost edge faces of the side walls are ground to present plane surfaces common to a plane that is parallel to the surface plane of the surface on which the outer races of the bearings are seated during the grinding operation.

BACKGROUND

The present invention relates to the art of anti-friction bearings, and in particular to roller bearing block assemblies employed as linear motion way bearings in heavy machines and installations requiring linear movement along a rail, track, or machine way. Such assemblies conventionally comprise a unit consisting of side walls which mount transversely between them a roller bearing in which the outer race is disposed between the load and its support.

In prior art bearing assemblies, if two or more bearing units are used at one location, highly critical drilling and matching of all bearing components is necessary in order to attain the uniform contact between track and the multiple outer races which the assembly must have in order to distribute the load equally and prevent excessive wear. Normal bearing tolerances make it a matter of great difficulty to attain the alignment precision necessary for uniformity of contact. In an attempt to avoid the necessity and complexities of high precision work in matching multiple bearing units, the prior art has resorted to the use of shims.

SUMMARY

The present invention contemplates a roller block assembly unit which uses only two unmatched bearings, and in which the need of precision drilling of side walls is eliminated; and the invention provides a novel method for making a two-bearing roller block assembly in which the bearing surface contact points of both bearings are precisely located in a single plane that corresponds to the planar face of a load or support surface engaged by the bearing surface contact points of both bearings when in service.

Broadly stated, the method of the present invention is directed to the production of a roller bearing assembly constituted as a unit composed of a pair of opposed side walls which carry between them a pair of transversely extending roller bearings in which the outer peripheral surfaces of their outer raceways are cylindrical bearing surfaces. The side walls are connected through elements of the bearings and, together with the bearings, constitute a block assembly that is an anti-friction bearing unit which may be interposed between a pair of bodies at least one of which has a planar bearing surface that is moved relative to the other in a linear path of travel. The unit is fixed to and carried by one of the bodies in such manner that, when in service, the cylindrical outer faces of the outer raceways contact the planar surface on the other body at points on both raceways which lie in a common plane that coincides with the plane of the planar surface. The body having the planar bearing surface may be a support in the nature of a track, rail, or machine way; in which case the other body may be a load to be supported by the track, rail, or machine way for linear movement thereon, with the roller bearing assembly unit fixedly attached to the load body in such manner that the cylindrical bearing surfaces of the outer raceways are in rolling contact with the planar surface of the supporting body. Of course, if desired, the body carrying the roller assembly may constitute the support and the body having the planar bearing surface may be the load.

The paramount feature of the present invention, is the method which assures that all points on the bearing surfaces of both outer raceways that, at any given moment, bear upon or against the planar bearing surface of track, rail, machine way of the like, will lie in a single plane common to all such points and the engaged planar bearing surface so that the load will be distributed uniformly on both roller bearings at all times in service.

In the drawings:
FIG. 1 is a side elevation, partly in section, of a roller block assembly of the present invention in a stage of processing.
FIG. 2 is an end elevation of the assembly shown in FIG. 1.
FIG. 3 is a sectional view substantially on line 3—3 of FIG. 1.
FIG. 4 is a fragmentary sectional view illustrating a detail of the assembly.

DETAILED DESCRIPTION

The foregoing drawings illustrate a preferred embodiment of my invention. As shown, the roller block assembly structure comprises a pair of oblong side walls 10 of rectangular cross section each having, with reference to FIGS. 1-3, a planar top edge face 11 and a planar bottom edge face 12 which lie, respectively, in a horizontal plane common to each top edge pair and in a horizontal plane common to each bottom edge pair. The side walls are fixedly connected in laterally spaced parallel relation by means of a pair of transversely extending shafts 13 seated at their ends in complemental socket bores in the side walls, with the axes of the shafts lying in a plane intermediate and parallel to the planes of the top and bottom edge faces of the side walls. The outer ends of each shaft 13 are flush with the outer face of the side wall in which they seat. A lubricant feed bore 14 extends axially inward from one outer end of each shaft and communicates with radial feed passages 15 which, in turn, communicate with feed passages 16 extending radially through the body of an inner raceway 17 to supply lubricant to anti-friction rollers 18 interposed between the inner raceway and a freely rotatable outer raceway 19 having a cylindrical outer surface 20 of appreciable axial extent but less than the distance between the opposed inner faces of the side walls, for clearance. The rollers 18 are maintained in centered position between retainer rings 21 seated in complemental socket grooves in the outer side faces of the raceways and in contact with the inner faces of the side walls as best shown in FIG. 3.

Preferably, the inner raceways 17 are press-fitted on their respective shafts 13 and extend axially at their ends into contact with the inner faces of the side walls. The shafts 13 are themselves fixedly secured in and to the side walls by means of dowel pins 22 seated in axially aligned bores extending vertically in the bodies of the side walls and the shaft ends. The shaft and dowel connections hold the side walls in fixed and properly spaced parallel relation such that the assembly of side walls and bearings constitutes a bearing block assembly capable of attachment as a unit to a linear motion body by bolts (not shown) seated in appropriate bolt holes 23 in the body of each side wall.

An important aspect of the invention is the disposition of the axes of the bearing shafts 13 relative to the plane common to those edge faces of the side walls that are adjacent the supporting face of a track, rail, machine way or the like upon which the outer raceways of the bearings roll when in service. It will be seen from FIG. 1 that the shaft axes are located in a common plane that is closer to the plane of the bottom edge faces of the side walls than it is to the plane common to the top edge faces of the walls. The outside diameter of each bearing is such that a portion of its outer raceway extends outwardly beyond the plane common to the side wall edge faces which are adjacent the supporting track, rail, or way upon which the bearings roll in service; and the plane of the edge faces passes through the outer raceways of the bearings as a chord of each. Furthermore, because of such disposition, the peripheries of the outer raceways adjacent the plane common to the other side edge faces (top in FIG. 1) are appreciably inward from that plane, thus leaving a marginal zone 24 of the side walls which affords ample material for removal by grinding, which zone is indicated by dotted line in FIGS. 1–3.

The two-bearing block assembly shown in the drawings is made with a pair of similar but unmatched roller bearings taken from stock and mounted between a pair of side walls in the relationship hereinbefore described. The block unit is then seated on the flat, planar face of a magnetized chuck or bed in a grinding machine in which a grinding wheel 25 is positioned above the flat faced magnetic bed plate or chuck 26. The block unit is placed on the bed plate with the outer raceways of both bearings contacting the planar face of the bed plate which then simulates a track, rail, machine way or the like.

When the two bearings are seated on the flat face of the magnetic bed plate, all points of bearing contact on the outer raceways of both bearings will automatically assume positions that lie in the face plane of the bed plate 26, regardless of differences between the outer diameters of the outer raceways and between their relative locations in the block unit. Magnetic side blocks 27 are then seated on the bed plate in tight engagement against the outer faces of the side walls 10, and these blocks in cooperation with the bed plate exert a strong downward magnetic pull on the all metal bearing block unit and hold it firmly in a stationary position on the bed plate.

The grinding wheel 25 is adjusted to a height above the planar face of the bed plate 26 such that when the wheel, which overlies both top edge surfaces 11 of the side walls, is brought into operative grinding engagement with both those surfaces and moved longitudinally thereon from end to end, it will grind off material from the marginal zones 24 of the side walls. The depth of the grind is predetermined by the setting of the grinding wheel, which is set to grind down the top edge faces 11 of the side walls until all points on the surfaces thereof lie in a single plane that is precisely parallel to the plane of bearing contact between the surfaces 20 of the outer raceways 19 and the planar face of the bed plate 26. By reason of the fact that during the grinding operation the mass of the grinding wheel imposes a downwardly acting load force on the top edge faces of the side walls, the load will be distributed uniformly over both bearings, because all points on their outer raceway surfaces 20 that contact the planar face of the bed plate 26 lie in a plane of contact common to the plane of the bed plate face, which face then occupies the position of the bearing contact face of a rail, track, machine way or the like upon which the bearings would roll in service.

Thus, the grinding operation performs a double function. It levels off the top edge faces of the side rails so that they lie in a common plane that is precisely parallel to the plane of bearing contact between the two bearings and the flat face of the supporting bed plate 26, and at the same time it applies a downwardly acting force simulating a live load, which assists the magnetic pull of the bed plate and the blocks 27 in anchoring the block assembly unit on the bed plate in firm bearing contact therewith.

Upon completion of the grinding operation the block assembly unit is properly conditioned for attachment to the bottom of a load body (not shown) with the top edge faces of the side walls fitted snugly thereagainst. When such load body is placed on a track, rail, machine way or the like with the outer raceway bearing surfaces in rolling contact therewith the load will be distributed uniformly on both bearings.

It will be evident from the foregoing description that the grinding operation trues the bearings so that, at all times, all the points of bearing contact in both bearings presented for seating engagement against a planar support surface will lie in a single plane common to all such points and tangential to the arcuate bearing surfaces of the outer raceways of both bearings.

I claim:

1. In the manufacture of a roller block assembly having a pair of opposed side walls supporting a pair of anti-friction rotary bearings extending transversely between them, the method of trueing the bearings for simultaneous equal rolling contact with a planar support surface, which comprises: disposing the bearings between the side walls at a location such that a transverse plane common to one edge of each side wall passes chordally through both bearings, leaving bearing contact surface portions of both bearings disposed outwardly of the plane of said edges; placing the bearing contact surfaces of both bearings in bearing contact with a planar support surface; anchoring the block assembly in a fixed position on the planar support surface; and performing a grinding operation on the opposed other edges of the side walls so that their ground faces lie at all points thereon in a transverse plane that is common to both ground faces and precisely parallel to the plane of the planar support surface.

2. In the manufacture of a roller block assembly as set forth in claim 1, using downward acting force incident to the grinding operation as a means participating in the anchoring.

References Cited

UNITED STATES PATENTS 3,077,061   2/1963   St. John _ _ _ _ _ _ _ _ _ _ _ _ 51—323 X LESTER M. SWINGLE, Primary Examiner